Patented Apr. 4, 1950

2,502,645

UNITED STATES PATENT OFFICE 2,502,645

UNSATURATED ALCOHOL ESTERS OF CYCLOHEXADIENE DICARBOXYLIC ACIDS

William E. Elwell, Berkeley, Calif., assignor to California Research Corporation, San Francisco, Calif., a corporation of Delaware No Drawing. Application February 8, 1946, Serial No. 646,482

5 Claims. (Cl. 260—78.4)

This invention relates to new esters of cyclohexadiene polycarboxylic acids. More particularly, the invention pertains to a new class of unsaturated alcohol esters, especially vinyl carbinyl esters of cyclohexadiene dicarboxylic acids.

It has been discovered that esters having very valuable and apparently unique properties may be obtained by reacting an unsaturated alcohol, such as a vinyl carbinol, with a cyclohexadiene dicarboxylic acid or an anhydride or other suitable derivatives thereof. Such esters are much more stable than could be predicted from their high degree of unsaturation and yet are polymerizable by certain methods. These properties render the esters particularly useful as resin-forming agents, and in plastics, coating compositions, adhesives and the like.

It has been found, for example, that vinyl carbinyl esters of cyclohexadiene dicarboxylic acids may be polymerized to valuable resins varying in properties from a viscous liquid through a soft and pliable or tacky solid to a resin of hard and tough character. These polymers also are capable of adhering tenaciously to glass and other solid surfaces frequently found difficult to bind by adhesives.

The cyclohexadiene dicarboxylic acids from which the compositions of this invention may be derived exist in a number of related isomeric forms. Although these acids have common properties characteristic of the family, they also have outstanding distinguishing properties which set them apart from each other. The system of nomenclature here utilized for identifying these different isomeric acids adopts a standard numbering of the carbon atoms of the cyclohexadiene ring illustrated by the following:

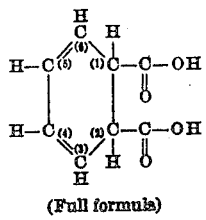

(Full formula)

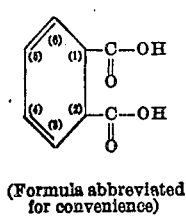

(Formula abbreviated for convenience)

Thus, the position of the carboxyl groups in the above compound is (1), (2).

In the terminology here used, the sign Δ signifies a double bond, and Δ1 would indicate a double bond between the (1) and (2) carbon atoms of the ring; Δ2 would place the double bond between the (2) and (3) carbon atom, etc. The complete name of the above acid would, therefore, be Δ3,5-cyclohexadiene dicarboxylic acid-1,2. When the stereo-isomer of this acid is the cis form, it is anhydride forming, when the trans type, it does not form the corresponding anhydride but rather the anhydride of the cis acid when treated with suitable reagents such as acetic anhydride.

The foregoing and other acids of this series are sometimes termed dihydrophthalic acids, and identifying numbers utilized merely to place the position of the added hydrogen atoms; for example, the foregoing acid could be designated 1,2-dihydrophthalic acid. But this terminology is misleading insofar as it implies equivalency between phthalic acids and the cyclohexadiene dicarboxylic acids. Accordingly, this specification utilizes terminology which is believed to describe more accurately the nature of the compounds and compositions discovered.

The compounds and compositions of this invention may be derived from any one or more of the following exemplary cyclohexadiene dicarboxylic acids:

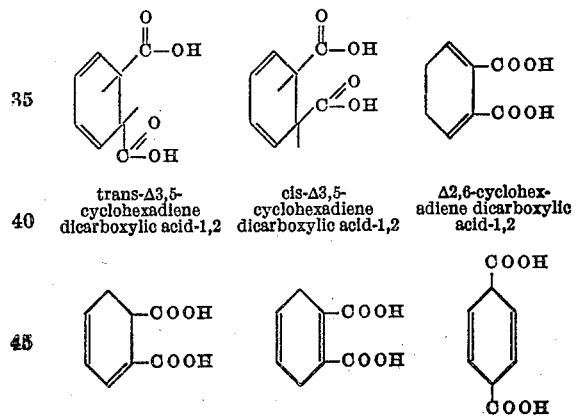

trans-Δ3,5-cyclohexadiene dicarboxylic acid-1,2 cis-Δ3,5-cyclohexadiene dicarboxylic acid-1,2

Δ2,6-cyclohexadiene dicarboxylic acid-1,2

Δ2,4-cyclohexadiene dicarboxylic acid-1,2

Δ1,4-cyclohexadiene dicarboxylic acid-1,2

Δ2,5-cyclohexadiene dicarboxylic acid-1,4

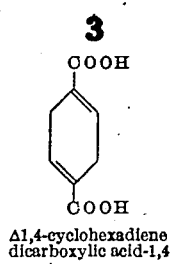
Δ1,4-cyclohexadiene dicarboxylic acid-1,4

Of the cyclohexadiene dicarboxylic acids, the conjugated diene acids are preferred, and derivatives of the Δ3,5 or Δ2,6-cyclohexadiene dicarboxylic acid-1,2 are at present regarded as most desirable. A mixture predominantly trans-Δ3,5-cyclohexadiene trans-dicarboxylic acid-1,2 but containing small amounts of Δ2,6-hexadiene dicarboxylic acid-1,2 has been found effective for the purposes of this invention.

In accordance with the invention, the new esters may be formed by esterification of a suitable cyclohexadiene polycarboxylic acid with an unsaturated alcohol. The new class of esters is characterized by the type formula—

$$U_1-O-C(=O)-\text{[cyclohexadiene]}-C(=O)-O-R$$

or $$U_1-O-C(=O)-\text{[cyclohexadiene]}-C(=O)-O-U_2$$

where $U_1$ and $U_2$ are unsaturated radicals, desirably the residue of an unsaturated alcohol having a terminal methylene group, and preferably a vinyl carbonyl radical containing the characteristic group

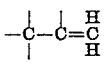

R is selected from the group consisting of unsaturated organic radicals, saturated organic radicals, hydrogen, and the chemical equivalent of a metal or other basic group. Preferably R is a hydrocarbon radical such as a saturated or unsaturated alkyl, cycloalkyl or aralkyl group. The preparation of these esters is complicated by the capacity of the acids or the esters to polymerize and by possible rearrangement of the double bonds in the cyclohexadiene ring. Accordingly, a desirable composition for the preparation of polymers is frequently a mixture of one or more of the monomeric esters which may also contain polymers thereof.

A preferred type ester is derived from an unsaturated alcohol having a terminal methylene group. Desirably, the unsaturated alcohol may contain from 2 to about 20 and preferably 3 to 6 carbon atoms. The alcohols preferred are of the vinyl carbinol type, i. e., an alcohol containing the characteristic group

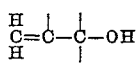

Examples of vinyl carbinols are:

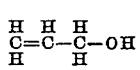
Vinyl carbinol (allyl alcohol)

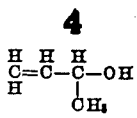
Vinyl methyl carbinol (α-methyl allyl alcohol)

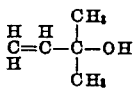
Vinyl dimethyl carbinol (α,α-dimethyl allyl alcohol)

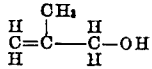
α-methyl-vinyl carbinol (methallyl alcohol or isopropenyl carbinol)

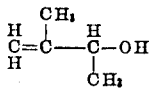
α-methyl-vinyl methyl carbinol (methyl isopropenyl carbinol)

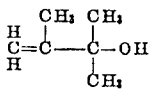
α-methyl-vinyl dimethyl carbinol (dimethyl isopropenyl carbinol)

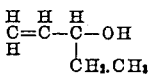
Vinyl ethyl carbinol

Examples of other unsaturated alcohols with terminal methylene groups are the following:

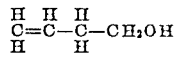
4-hydroxy-butene-1 (1-buten-4-ol)

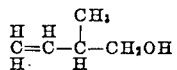
4-hydroxy-3-methyl-butene-1 (3-methyl-1-buten-4-ol)

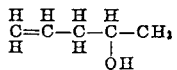
4-hydroxy-pentene-1 (4-methyl-1-buten-4-ol)

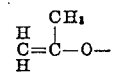
α-methyl-vinyl alcohol (exists in form of derivatives)

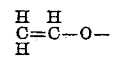
Vinyl alcohol (exists only in form of derivatives)

Other unsaturated alcohols may be utilized within the broader aspects of this invention. These additional alcohols are illustrated by the following:

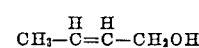
4-hydroxy-butene-2 (crotyl alcohol)

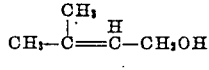
4-hydroxy-2-methyl-butene-2 (β-methyl-crotyl alcohol)

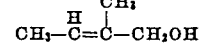
4-hydroxy-3-methyl-butene-2 (α-methyl-crotyl alcohol)

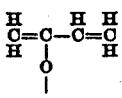

2-hydroxy-butadiene-1,3 (exists as derivatives)

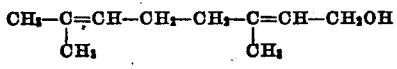

Geraniol

Octadecenyl alcohol

Alicyclic unsaturated alcohols such as cyclopentenyl, cyclohexenyl, and the like, as well as abietol, terpenols, and heterocyclic alcohols are not precluded. Mixtures of unsaturated alcohols or of unsaturated with saturated or other alcohols may be used to obtain mixed esters; for example, a mixture of allyl alcohol with methyl vinyl carbinol or methyl alcohol in equal molar proportions yields a mixed ester in which at least some of the acid molecules are esterified with one type alcohol on one acid group and the second type alcohol on the second acid group.

The following specific examples will serve to illustrate the derivation and preparation of the esters of this invention and to guide those skilled in the art in obtaining the same.

Example 1

A vinyl carbinyl ester was derived from Δ3,5-cyclohexadiene trans-dicarboxylic acid-1,2 by esterification of vinyl carbinol (allyl alcohol) in the presence of silica gel.

15 grams of the acid, 100 cc. of allyl alcohol and a trace of HCl were refluxed in the presence of silica gel in 8-hour periods for two days. The liquid reaction mixture was decanted from the silica gel, the latter washed with three 25-cc. portions of fresh allyl alcohol, the washings combined with the reactant and the refluxing continued as before in the presence of fresh silica gel. The gel was replaced two or more times in this manner, allowing 8 hours reflux each time. On completion of the refluxing, the mixture was filtered and poured into a 5-fold excess of water, the product separated after settling and dried over calcium chloride. Approximately 10 grams yield was obtained of heavy liquid showing an index of refraction of 1.094 and an acid number of 93. The theoretical for the pure acid is 320 and the mono allyl ester 160. Some hydrolysis appeared to occur during the acid value titration as a fading end point was observed.

Example 2

The diallyl ester (i. e., vinyl carbinyl diester) of Δ3,5-cyclohexadiene trans-dicarboxylic acid-1,2 was prepared utilizing benzene sulfonic acid as the catalyst and carbon tetrachloride as the solvent. The Δ3,5-cyclohexadiene dicarboxylic acid, allyl alcohol, benzene sulfonic acid and carbon tetrachloride were mixed in the molecular ratio of 205:655 to 10:1060, respectively. This mixture was heated so that it slowly distilled for from 6 to 10½ hours in a recycle system. The distillate was condensed, passed through a trap to remove the bulk of the water formed by esterification, and finaly passed over anhydrous potassium carbonate or other suitable dehydrating agent before returning it to the reaction flask. At the end of reaction, the mixture was washed once with water and three times with a 5% aqueous solution of sodium bicarbonate, or until the aqueous wash water was slightly alkaline to litmus. The mixture was then washed three times with water and dried over a dehydrating agent, such as a mixture of anhydrous sodium sulfate and potassium carbonate. (If an emulsion forms during the above washing operations, it may be broken by the addition of ether.) The dried solution of the ester was filtered and the low boiling liquids were removed by heating under vacuum. The product remaining was a light yellow oil. This oil was decolorized by stirring a carbon tetrachloride solution of the ester with decolorizing carbon for 2 hours, filtering the solution and removing the carbon tetrachloride by heating under vacuum. The final product was a colorless or light yellow oil with a faint, pleasant odor. The yield of the ester was 56.2% to 74.5% of the theoretical, the higher yield being obtained with the above-mentioned longer reaction time. The ester and its solutions were stored under a carbon dioxide atmosphere in a refrigerator during any interruption in its preparation and after its preparation.

Example 3

The diallyl ester (vinyl carbinyl diester) of Δ3,5-cyclohexadiene trans-dicarboxylic acid-1,2 also was prepared by refluxing a mixture of the acid, allyl alcohol, and sulfuric acid (molecular ratio of 201:1610:10) in an atmosphere of carbon dioxide for 4 hours. In this method, a portion of the allyl alcohol was distilled off at the end of the first, second and third hour to remove water formed during the esterification. Following each distillation, sufficient allyl alcohol was added to the reaction mixture to bring the total volume up to that at the start of the reaction. The isolation and purification of the ester was effected in the same manner as described in Example 2. The product obtained by this method was usually darker in color than that from Example 2 and the yield was 78.1% to 84.6% of the theoretical.

The properties and analysis of a diallyl ester (a typical vinyl carbinyl diester) of Δ3,5-cyclohexadiene trans-dicarboxylic acid-1,2 are as follows:

| Test | Calculated | Found |
| --- | --- | --- |
| Per cent carbon | 67.72 | 67.5 |
| Per cent hydrogen | 6.50 | 6.34 |
| Molecular weight | 248 | [1] 250 |
| Saponification equivalent | 124 | 124 |
| Iodine number | 307 | 296 |
| $n_D^{20}$ | | 1.4950 |
| $d_{15.5°}^{15.5°}$ | | 1.0913 |
| Molecular refraction | 66.51 | 66.35 |

[1] Ebullioscopic method.

Iodine numbers were determined by the Wijs method, using a contact time of 2 hours. The consistently low values obtained conform to the findings that iodine numbers do not of necessity quantitatively measure degree of unsaturation (Tout, Bull. Soc. Chem. 9, 899 (1942)). Accordingly, the iodine numbers indicate the assigned unsaturated structure of the compound. The molecular refractions were calculated for no exaltation. It has been observed that cyclohexadiene shows no exaltation (Zelinsky and Gorsky, Ber., 41, 2482 (1908)).

In the preparation of these esters, it is possible to effect a rearrangement in which the double bonds of the cyclohexadiene ring become conjugated with the carbonyl-oxygen double bonds, thereby resulting in the isomeric ester of Δ2,6-cyclohexadiene dicarboxylic acid-1,2:

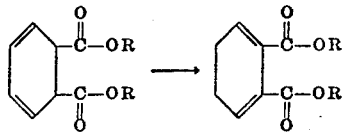

The ultraviolet light absorption spectra of the foregoing typical diallyl ester were investigated and showed a maximum absorption at 254 mμ like that of the parent acid. This demonstrates that isomerization had not occurred and that the compound was the vinyl carbinyl diester of the Δ3,5-cyclohexadiene carboxylic acid-1,2.

*Example 4*

The diallyl ester of Δ2,6-cyclohexadiene dicarboxylic acid-1,2 was prepared according to the method described in Example 2 above. The resulting crude ester was a dark, golden brown oil and, when decolorized in carbon tetrachloride with decolorizing carbon, the final product was a golden, mobile liquid with a very faint, pleasant odor. The yield was 56.4% of the theoretical. Analysis of this material gave the following results:

| Test | Calculated | Found |
|---|---|---|
| Per cent carbon | 67.73 | 67.46 |
| Per cent hydrogen | 6.50 | 6.49 |
| Molecular weight | 248 | ¹ 235 |
|  |  | ² 241 |
| Saponification equivalent | 124.0 | 121.0 |
| Iodine number | 307 | 223 |
| $n_D^{20}$ |  | 1.5029 |
| $d_{15.5°}^{15.5°}$ |  | 1.1055 |
| Molecular refraction | 66.51 | 66.39 |
| Neutralization equivalent | 409 | 409 |

¹ Ebullioscopic method.
² Freezing point.

Ultraviolet light absorption data for this ester is in agreement with that for the parent acid. Iodine number reveals that the unsaturation of the ester is less active than that of the corresponding ester of the Δ3,5-acid. This fact also is shown by relative polymerization activities, as hereinafter described. The boiling range of the ester product was 156° to 162° C. at 4 mm. pressure and the bulk of the product was collected at 159° to 159.5° C. under 4 mm. pressure. The distilled ester is a colorless liquid.

*Example 5*

Δ2,4-cyclohexadiene dicarboxylic acid-1,2 and allyl alcohol are reacted to form an ester by the method and under conditions substantially as described in Example 2 above. Likewise, Δ2,5-cyclohexadiene dicarboxylic acid-1,4 may be reacted with allyl alcohol by this method to yield an ester according to this invention.

*Example 6*

Δ3,5-cyclohexadiene trans-dicarboxylic acid-1,2, methyl vinyl carbinol, benzene sulfonic acid and carbon tetrachloride were mixed in the molecular ratio of 205:2045:10:1590, respectively, and esterification effected as in the method of Example 2. The ester was also purified by the method of that example. The reaction time employed in the preparation was 16 hours. The product was a golden brown oil with a pleasant odor and the yield was 20.8% of the theoretical. The following tests established that the product was the diester of the Δ3,5-acid and methyl vinyl carbinol:

| Test | Calculated | Found |
|---|---|---|
| Percent carbon | 69.54 | 69.25 |
| Percent hydrogen | 7.30 | 7.23 |
| Molecular weight | 276 | ¹ 269 |
| Saponification equivalent | 138 | 137 |
| Iodine number | 276 | 262 |
| $n_D^{20}$ |  | 1.4834 |
| $d_{15.5°}^{15.5°}$ |  | 1.0440 |
| Molecular refraction | 75.64 | 75.72 |

¹ Cryoscopic method.

Ultraviolet light absorption spectra were investigated and showed a maximum absorption at 254 mμ like that of the parent acid.

*Example 7*

Δ3,5-cyclohexadiene trans-dicarboxylic acid-1,2, crotyl alcohol, benzene sulfonic acid and carbon tetrachloride were mixed in the molecular ratio of 205:1636:10:1060, respectively, and the preparation and purification of the ester was carried out as in the method of Example 2. The reaction time in this case was 6¾ hours. During the first water wash of the reaction mixture an emulsion formed which did not break when ether was added but was successfully separated into its component upon addition of sodium chloride. The product was a golden brown oil and the yield was 63.8% of the theoretical. The crude ester was decolorized by treating a carbon tetrachloride solution of the ester successively with decolorizing carbon, Florida clay and fuller's earth. The final product was the dicrotyl ester of Δ3,5-cyclohexadiene trans-dicarboxylic acid-1,2, and had a faint, pleasant odor, and a yellow color. Analysis of this material yielded the following results:

| Test | Calculated | Found |
|---|---|---|
| Per cent carbon | 69.54 | 69.24 |
| Per cent hydrogen | 7.30 | 7.24 |
| Molecular weight | 276 | ¹ 280 |
| Saponification equivalent | 138 | 138 |
| Iodine number | 276 | 270 |
| $n_D^{20}$ |  | 1.4959 |
| $d_{15.5°}^{15.5°}$ |  | 1.0607 |
| Molecular refraction | 75.72 | 76.08 |

¹ Ebullioscopic method.

Ultraviolet light absorption spectra gave a maximum at 254 mμ like that of the parent acid.

An octadecyl ester is prepared by reacting Δ3,5-cyclohexadiene trans-dicarboxylic acid-1,2 with octadecenyl alcohol. Conditions for the reaction are similar to those described in previous examples. In some instances it may be desired to prepare this ester and other similar esters of high molecular weight by reaction of the alcoholate with the cyclohexadiene acyl chloride or by an ester interchange reaction starting, e. g., with the dimethyl ester of Δ3,5-cyclohexadiene trans-dicarboxylic acid-1,2 and the desired alcohol.

Mixed esters containing two different radicals, at least one of which is unsaturated, are prepared either by partial ester interchange (e. g., replacing one methyl group of a dimethyl ester with a vinyl carbinyl) or by reaction of an acid ester of one alcohol with a different alcohol, thus:

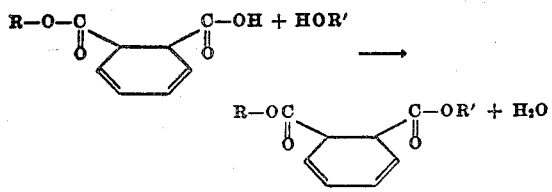

where R' is a vinyl carbinyl radical and R is a saturated or different unsaturated hydrocarbon radical. Examples of such compounds are the vinyl ester, the allyl ester, the methallyl ester or the methyl vinyl carbinyl ester of monomethyl, monoethyl, monopropyl, monobutyl, monohexyl, monocyclohexyl, mono-octyl, monolauryl, monocetyl, mono-oleyl or mono-octadecenyl esters of a Δ3,5- or a Δ2,6-cyclohexadiene dicarboxylic acid-1,2. A long chain alkyl radical (for instance, a saturated or unsaturated $C_{10}$ to $C_{20}$ aliphatic chain) is of advantage in those mixed esters where enhanced oil solubility or dispersibility is desired in the ester or the polymer or both.

The foregoing detailed disclosures are illustrative of methods for preparing the new esters here disclosed. In general, one should adopt esterification processes and conditions which avoid polymerization where the monomeric ester is desired. One important factor is avoidance of excessively high temperatures. This may be done in a number of ways, as, for example, by using a solvent for the reaction mixture which boils at a temperature below that at which excessive polymerization occurs. The use of such a solvent also has the advantage of preventing local overheating in the reaction mixture. Esterification catalysts are advantageous in promoting the reaction. Removal of water or other reaction product and promotion of esterification are advantageously effected either by carrying out the reaction under vacuum or by the selection of a solvent medium which carries water overhead by boiling at reaction temperature, or both. To induce more complete esterification in the reaction mixture, without causing polymerization, relatively high vacuum and avoidance of high temperature will be found helpful. Likewise, a polymerization inhibitor may be utilized to reduce or prevent polymerization during esterification where an ester of low polymer content is to be produced. Typical inhibitors of addition type polymerization are hydroquinone and tertiary butyl catechol.

Although the specific illustrations here given utilize the free acid in the esterification reaction, it is to be understood that other ester-forming derivatives of the cyclohexadiene dicarboxylic acids may be substituted therefor. Where the acid is of the anhydride-forming type, it is frequently advantageous to substitute the anhydride for the free acid, also it is possible to use other ester-forming derivatives, such as the acid chloride, the amide or the imide, with liberation of the more volatile HCl or $NH_3$ from an anhydrous reaction medium during esterification. Suitable precautions may be taken to prevent addition of the HCl or $NH_3$ to the ester. Ester interchange may be utilized to prepare the unsaturated alcohol esters, as by reacting a substantially higher molecular weight unsaturated alcohol with an ester of a lower molecular weight alcohol, e. g., methyl. Other suitable variations of the methods herein disclosed will be apparent to those skilled in the art.

Among the valuable properties of the new esters of this invention, the combination of polymerizability, together with relatively high stability of the monomeric esters, appears to be outstanding. For example, the diene system of the cyclohexadiene ring is more stable in the new esters than might be predicted, even though the pair of double bonds to be conjugated with each other or with the double bonded oxygen of the carbonyl group. Despite this relatively high stability, or conversely, relatively low reactivity, the compounds are polymerizable and convertible to valuable resinous compositions. But even in their resin-forming tendencies, these new esters appear to be unique in their behavior.

For example, the diallyl esters of the Δ3,5-acid do not respond to polymerization conditions in a manner characteristic either of a conjugated diene system or of a vinyl carbinyl unsaturation. Thus, it appears that the unsaturation system presented by the six-membered diene ring coupled through an ester linkage to an olefinic unsaturation yields new and valuable properties, particularly in respect to polymerization behavior. That this property is due to the combination of the two types of unsaturation is illustrated by the fact that elimination of either gives a distinctly different behavior. These facts are demonstrated by the comparisons set up in Table 1.

Table 1

| Compound | Type of polymerization | |
|---|---|---|
| | Peroxide cat. (105° C.— 18 hrs.) | Thermal (200° C.— 2 days) |
| Diallyl phthalate | Pos | Neg. |
| Dipropyl ester of Δ3,5-cyclohexadiene acid | Neg | Neg. |
| Diallyl ester of Δ3,5-cyclohexadiene acid | Neg | Pos. |
| Diallyl ester of Δ2,6-cyclohexadiene acid | Neg | Neg. |
| Dipropyl ester of Δ2,6-cyclohexadiene acid | Neg | |

A study of Table 1 will reveal that the diallyl esters of cyclohexadiene acids are not typical of vinyl carbinyl-type unsaturation illustrated by diallyl phthalate, since the latter compound responds to peroxide catalysis under a given set of conditions, whereas the cyclohexadiene esters do not. Similarly, elimination of unsaturation in the alcohol component of the ester, as in the dipropyl ester of the cyclohexadiene acids, or shifting double bonds from the Δ3,5 to Δ2,6 position, diminishes thermal polymerization and even prevented it under the conditions of this test. The reader is cautioned that Table 1 is valid for comparative purposes and to illustrate the unique character of the esters here disclosed, but that the data are not to be interpreted as meaning any particular type of polymerization is impossible or will not occur under conditions adapted to a specific compound in question. Data given in subsequent examples and tables illustrate operable conditions for various types of polymerizations of cyclohexadiene vinyl carbinyl esters.

The exact mechanism of the polymerization of the new vinyl carbinyl esters (of the Δ3,5-acid, for example) has not been unequivocally established. However, the data indicate that thermal polymerization occurs by coaction of the allyl double bond with one of the diene double bonds to yield a complex copolymer in three major stages:

(1) Viscous liquid to soft thermoplastic solid polymers of the linear type with insignificant three-dimensional cross-linking.

(2) A plastic, or gel type, solid polymer of a semicross-linked type.

(3) A solid infusible, insoluble three-dimensional cross-linked polymer.

An equation for this coactive polymerization of the diallyl double bond with one of the diene double bonds is as follows:

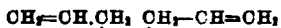
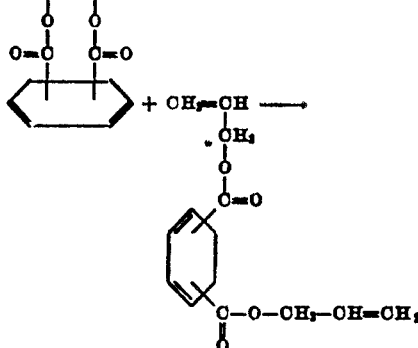
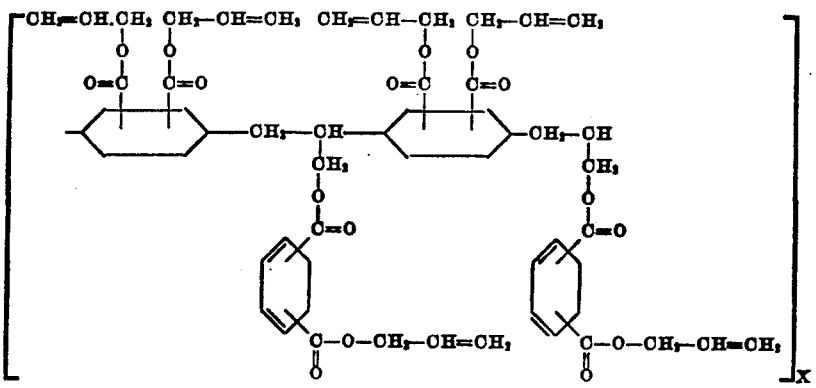

The above formula applies to a polymer of the first stage type. Minor degrees of cross-linking involving remaining free vinyl or allyl groups will produce a second stage type polymer, whereas more cross-linking yields a third stage or three-dimensional polymer.

Irrespective of the correctness of the theory as to mechanism, the polymerization reaction may be interrupted at the first stage to yield a liquid to thermoplastic solid polymer useful in coating or impregnating compositions. After application as a coating or impregnant, this first stage polymer may then be converted to the infusible, insoluble type product by further polymerization, e. g., with heat. Alternatively, the polymerization may be allowed to progress to the second stage gel-type polymer and then interrupted to yield a polymeric composition which can be molded. For example, the gel-type second stage polymer may be dried and comminuted for ease of handling in a thermosetting molding operation in which it is converted into shaped articles of the third and final stage infusible, insoluble polymer.

The invention also embraces the cyclohexadiene dicarboxylic acid monoesters of unsaturated alcohols which, in turn, may be polymerized either alone or copolymerized with a diester of these acids or with other suitable polymerizable unsaturated compounds, such as vinyl compounds, allyl maleates, allyl acrylates, and the like. Desirably, the monoesters of unsaturated alcohols and the cyclohexadiene dicarboxylic acids are produced by esterification of one of the carboxyl groups with a vinyl carbinol and by blocking the remaining carboxyl group of the acid with a suitable substitute, such as a saturated alcohol or a metal. Examples of the resulting mixed esters are the monomethyl monoallyl or monomethyl monovinyl ester of the $\Delta$3,5-cyclohexadiene dicarboxylic acid-1,2; the monopropyl monoallyl ester of $\Delta$3,5-cyclohexadiene dicarboxylic acid-1,2; and the sodium salt of the monovinyl or monoallyl ester of $\Delta$3,5-cyclohexadiene dicarboxylic acid-1,2. Likewise, the monomethyl monovinyl ester of $\Delta$2,6-cyclohexadiene dicarboxylic acid, and other mixed esters, as listed above, in which the $\Delta$2,6-acid is substituted for the $\Delta$3,5-acid, may be polymerized alone or copolymerized with vinyl compounds, allyl maleates, allyl acrylates, etc.

Before giving in detail specific data on the various methods of polymerization and resulting polymers derived from the new esters, the following guiding factors are submitted. The relative rates of polymerization differ as between the several types of process; for example:

Type of polymerization

Peroxide catalysis........................ Diallyl phthalate > diallyl ester of $\Delta$3,5-acid > diallyl ester of $\Delta$2,6-acid Thermal.............................. Diallyl ester of $\Delta$3,5-acid > diallyl ester of $\Delta$2,6-acid or diallyl phthalate As respects properties, the polymer of diallyl ester of $\Delta$3,5-cyclohexadiene trans-dicarboxylic acid-1,2 is tougher and harder with longer reaction time. Also, the peroxide catalyzed polymerization product is softer when polymerization is effected at 150° C. than that obtained at 200° C.

The following examples of typical polymerization procedures will serve to illustrate this aspect of the invention.

Example 8

A hard, thermosetting, three-dimensional polymer was prepared from the ester product of Example 1 by placing a portion thereof in an open beaker overnight on a steam plate (temperature about 100° C.), under which conditions it polymerized to a hard, tough film that adhered to the glass tenaciously. This film could not be scratched by the hardest pencil (6H) and was scratched with difficulty with iron. These properties render the ester particularly adapted to the preparation of composite articles, such as impregnated glass fabric, as well as for use as an adhesive in laminated glass or as a coating for glass-like plastics (e. g., acrylate-type resins) which are deficient in surface hardness.

Example 9.—Thermal polymerization of Δ3,5-ester

Five parts by weight of the diallyl ester of Δ3,5-cyclohexadiene trans-dicarboxylic acid-1,2 was charged into a container. The container was cooled in an ice bath swept out with carbon dioxide, sealed and stored in an oven at 200°±5° C. At the end of 17 hours, the original mobile liquid was converted to a hard, clear, golden brown solid.

Example 10.—Peroxide catalyzed polymerization of Δ3,5-ester

Five parts by weight of the diallyl ester of Δ3,5-cyclohexadiene trans - dicarboxylic acid - 1,2 was mixed with 0.05 parts by weight of benzoyl peroxide in a container. The container was swept out with carbon dioxide after cooling in an ice bath and placed in an oven at 200°±5° C. At the end of 5½ hours, the original mobile liquid was converted to a clear, soft, plastic resin.

Example 11.—Polymerization with gaseous oxygen

Oxygen was slowly bubbled through two samples of the diallyl ester of Δ3,5-cyclohexadiene trans-dicarboxylic acid-1,2 and heated in an oven at 105°±2° C. The first sample contained no oxidation catalyst and the second sample contained 0.03% cobalt siccative in the form of cobalt naphthenate. The uncatalyzed sample was converted to a golden, clear, plastic solid at the end of about 18 hours. In the same period the cobalt catalyzed sample was converted to a clear, soft, golden brown resin of the gel type.

Example 12.—Polymerization of Δ2,6-ester by acid catalysis

Five parts by weight of the diallyl ester of Δ2,6-cyclohexadiene dicarboxylic acid was mixed with 4.1% by weight of aluminum chloride in a container. The tube was then swept out with carbon dioxide, loosely stoppered and stored in an oven at 176–200° C. After 2½ hours, the orignal liquid was transformed to a clear, soft, yellow wax.

The foregoing and additional data are summarized in Tables 2, 3, 4, 5 and 6.

Table 2.—Peroxide Catalysis

| Ester | Polymerization Conditions | | | Results |
|---|---|---|---|---|
| | Catalyst | Time | Temp. | |
| | | | °C. | |
| Dially phthalate ᵃ | 1% Benzoyl peroxide | 63 min. | 105±2 | Soft, clear, colorless plastic. |
| Do ᵃ | 1% Benzoyl peroxide | Overnight | 105±2 | Rubbery, clear, colorless plastic. |
| Do ᵃ | 1% Benzoyl peroxide | 6 days | ~60 | Soft, clear, colorless jelly. |
| Diallyl ester of trans-Δ3,5-acid * ᵃ | 1% Benzoyl peroxide | 3 days | 105±2 | No change. |
| Do * ᵃ | 2% Benzoyl peroxide | do | 105±2 | Do. |
| Do * ᵃ | 5% Benzoyl peroxide | do | 105±2 | Do. |
| Do * ᵃ | 1% Benzoyl peroxide | 6 days | 105±2 | Increase in viscosity. |
| Do * ᵃ | 2% Benzoyl peroxide | do | 105±2 | Do. |
| Do * ᵃ | 5% Benzoyl peroxide | do | 105±2 | Do. |
| Do * ᵃ | 1% Benzoyl peroxide | 2 days | 150±5 | Clear, soft plastic. |
| Do * | 1% Benzoyl peroxide | 5½ hrs | 200±5 | Do. |
| Do * | 5% Benzoyl peroxide | 5⅔ hrs | 165–192 | U. S. liq. (vis.>when no peroxide). |
| Do * | 5% Benzoyl peroxide | 20½ hrs | 165–192 | Hard, tough, clear solid. |
| Diallyl ester of Δ2,6-acid ** ᵃ | 1% Benzoyl peroxide | 6 days | 105±2 | No change. |
| Do ** ᵃ | 2% Benzoyl peroxide | do | 105±2 | Do. |
| Do ** ᵃ | 5% Benzoyl peroxide | do | 105±2 | Do. |
| Do ** ᵃ | 1% Benzoyl peroxide | 4 days | 150±5 | Do. |
| Do ** ᵃ | 1% Benzoyl peroxide | 3 days | 200±5 | Do. |
| Do ** ᵃ | 5% Benzoyl peroxide | 3¼ hrs | 200±5 | Small amount of solid. |
| Do ** ᵃ | 4.08% Benzoyl peroxide | 18 hrs | 200±5 | Yellow, clear polymeric solid. |
| Do ** ᵃ | 10.2% Benzoyl peroxide | do | 200±5 | Golden brown resinous solid. |
| Dipropyl ester of trans-Δ3,5-acid * ᵃ | 10% Benzoyl peroxide | 3¼ hrs | 200±5 | No polymerization. |
| Do * | 4.63% Benzoyl peroxide | 18 hrs | 200±5 | Do. |
| Do * | 10.57% Benzoyl peroxide | do | 200±5 | Do. |
| Dipropyl ester of Δ2,6-acid ** | 4% Benzoyl peroxide | do | 200±5 | Do. |
| Do ** | 9.94% Benzoyl peroxide | do | 200±5 | Do. |

\* Ester of Δ3,5-cyclohexadiene trans-dicarboxylic acid-1,2.
\*\* Ester of Δ2,6-cyclohexadiene dicarboxylic acid-1,2.
ᵃ Sealed under $CO_2$; others in loosely stoppered container swept out with $CO_2$.

Table 3.—Polymerization with Gaseous Oxygen

| Ester | Polymerization Conditions | | | Results |
|---|---|---|---|---|
| | Catalyst | Time | Temp. | |
| | | | °C. | |
| Diallyl ester of trans-Δ3,5-acid* | None | Overnight | 105±2 | Golden brown, clear, plastic solid. |
| Do* | 0.03% Co ¹ | do | 105±2 | Golden brown gel. |
| Diallyl ester of Δ2,6-acid** | None | 3 days | 105±2 | Dark golden brown solid. |
| Do** | 0.03% Co ¹ | Overnight | 105±2 | Soft golden brown gel. |
| Dipropyl ester of Δ3,5-acid* | None | 18 hrs | 100±5 | No polymerization. |
| Do* | 0.2% Co ¹ | 26 hrs | 100±5 | Viscosity increase. |
| Dipropyl ester of Δ2,6-acid** | None | 18 hrs | 100±5 | No polymerization. |
| Do** | 0.2% Co ¹ | 26 hrs | 100±5 | Viscosity increase. |

\* Ester of Δ3,5-cyclohexadiene trans-dicarboxylic acid-1,2.
\*\*Ester of Δ2,6-cyclohexadiene dicarboxylic acid-1,2.
¹ Incorporated as cobalt naphthenate in a petroleum hydrocarbon thinner.

Table 4.—Effect of Ultra-violet Light

| Ester | Polymerization Conditions | | | Results |
|---|---|---|---|---|
| | Catalyst | Time | Temp. | |
| | | *Days* | *° C.* | |
| Diallyl ester of trans-$\Delta$3,5-acid* ᵇ | None | 6 | ~60 | No change. |
| Diallyl ester of $\Delta$2,6-acid** ᵇ | ...do | 6 | ~60 | Do. |

*Ester of $\Delta$3,5-cyclohexadiene trans-dicarboxylic acid-1,2.
**Ester of $\Delta$2,6-cyclohexadiene dicarboxylic acid-1,2.
ᵇ Sealed tubes under $CO_2$.

Table 5.—Thermal Polymerization

| Ester | Polymerization Conditions | | | Results |
|---|---|---|---|---|
| | Catalyst | Time | Temp. | |
| | | | *° C.* | |
| Diallyl phthalate ᵇ | None | 7 days | ~60 | No change. |
| Do ᵇ | ...do | ...do | 105±2 | Do. |
| Do ᵇ | ...do | 2 days | 200±5 | Do. |
| Diallyl ester of trans-$\Delta$3,5-acid* ᵇ | ...do | 3 days | 105±2 | Do. |
| Do* ᵇ | ...do | 6 days | 105±2 | Viscosity increase. |
| Do* ᵇ | ...do | Overnight | 200±5 | Hard, clear, golden brown, plastic solid. |
| Do* | ...do | 5½ hrs | 165-192 | Viscosity increase. |
| Do* | ...do | 20½ hrs | 165-192 | Hard, tough, clear solid. |
| Diallyl ester of $\Delta$2,6-acid** ᵇ | ...do | 6 days | 105±2 | No change. |
| Do** ᵇ | ...do | 3 days | 200±5 | Do. |
| Dipropyl ester of trans-$\Delta$3,5-acid* ᵇ | ...do | ...do | 200±5 | Do. |

*Ester of $\Delta$3,5-cyclohexadiene trans-dicarboxylic acid-1,2.
**Ester of $\Delta$2,6-cyclohexadiene dicarboxylic acid-1,2.
ᵇ Sealed under $CO_2$; others in loosely stoppered container swept out with $CO_2$.

Table 6.—Polymerization with Acid-type Catalyst

| Ester | Polymerization Conditions | | | Results |
|---|---|---|---|---|
| | Catalyst | Time | Temp. | |
| | | | *° C.* | |
| Diallyl ester of 2,6-acid** | 4.07% $AlCl_3$ | 1¹/₁₂ hrs | 173.5-200 | Clear yellow grease. |
| Do** | 4.1% $AlCl_3$ | 2½ hrs | 176-200 | Clear soft yellow wax. |
| Do** | 4.15% $FeCl_3 \cdot 6H_2O$ | 30 min | 178-200 | White precipitate formed. |
| Dipropyl ester of 2,6-acid** | 4.25% $AlCl_3$ | 2¾ hrs | 200±5 | Clear golden brown grease. |
| Dipropyl ester of trans-3,5-acid* | 4.0% $AlCl_3$ | 1½ hrs | 173.5-200 | Slight viscosity increase. |
| Do* | 4.15% $AlCl_3$ | 2½ hrs | 176-200 | Do. |
| Do* | 4.74% $AlCl_3$ | 2¾ hrs | 200±5 | Green grease. |
| Do.*ᵇ | 5.6% $AlCl_3$ | 20 min | 200±5 | Golden, clear grease. |
| Do*ᵇ | 3.2% $FeCl_3 \cdot 6H_2O$ | 20 min | 200±5 | White precipitate. |
| Diallyl phthalate | 4.0% $AlCl_3$ | 55 min | 165-192 | Golden gel and some liquid. |
| Do | 4.0% $FeCl_3 \cdot 6H_2O$ | 125 min | 165-192 | Golden brown liquid with black precipitate (looks like charcoal). |
| Diallyl ester of 3,5-acid* | 4.0% $AlCl_3$ | 20½ hrs | 165-192 | Golden colored plastic solid. |
| Do* | 4.0% $FeCl_3 \cdot 6H_2O$ | 55 min | 165-192 | Golden brown weak and somewhat elastic solid. |

*Ester of $\Delta$3,5-cyclohexadiene trans-dicarboxylic acid-1,2.
**Ester of $\Delta$2,6-cyclohexadiene dicarboxylic acid-1,2.
ᵇ Sealed under $CO_2$; others in loosely stoppered container swept out with $CO_2$.

From the data of Table 2 it will be seen that the presence of both the conjugated diene of the cyclohexadiene ring and of the unsaturation in the alcohol radical yield properties distinct from those attributable to either type of unsaturation alone. The vinyl carbinyl unsaturation of diallyl phthalate is responsive to peroxide catalysts, but substitution of the diene unsaturation for that of the benzene ring increases stability of the vinyl carbinyl unsaturation of peroxides. Yet peroxide catalysis is effective to produce polymerization under conditions where this reaction does not otherwise occur (compare results from peroxide and thermal polymerization with the $\Delta$2,6-ester). This peculiar action is not attributable to diene system alone, since substitution of dipropyl for diallyl in the molecule yields still different properties, even though the alcohol radical contains the same number of carbon atoms.

Typical esters of this invention are stable to ultraviolet light alone at room temperature—Table 4—but are polymerized with gaseous oxygen at superatmospheric temperature. The presence of a drier in the ester modifies and accelerates the polymerization of the $\Delta$2,6-allyl ester and of the $\Delta$3,5-propyl ester with gaseous oxygen. The diallyl ester of the $\Delta$3,5-acid is more reactive to thermal polymerization than any of the other esters listed in Table 5.

Table 6 gives data on tests with typical acid-type catalysis. The term "acid-type catalyst" is used in the polymer art to designate compounds which are acid in nature or which hydrolyze to an acid product. Examples of these compounds are aluminum chloride and other salts of amphotheric metals (e. g., $FeCl_3$, $ZnCl_2$) as well as $BF_3$ and the like. The data of Table 6 show that the esters of this invention are reactive to acid-type catalysts.

Although valuable for many purposes, the new esters here disclosed are especially useful as resin-forming agents. Their low viscosity, relative stability and the fact that they may be polymerized without the formation of volatile constituents (as in polycondensation reaction)

makes the monomeric esters highly valuable as thermosetting materials. Thus, the esters (or first stage polymers thereof, where higher viscosity is acceptable) may be used to impregnate materials and then polymerized in situ with heat and/or catalysts to increase resistance to solvents and other deteriorating influences.

The high adhesion exhibited by the polymers renders the compounds particularly useful as an impregnant for glass fabrics. A woven or felted glass fiber fabric may be impregnated with an ester, such as the diallyl esters of $\Delta 3,5$-cyclohexadiene dicarboxylic acid-1,2, or the like, and the ester then polymerized in situ at relatively low or contact molding pressures with a comparatively low degree of heat to obtain a composite article of valuable mechanical properties. Likewise, the esters or low polymers thereof are valuable as constituents in surface coating compositions, and on baking, set readily to hard, tough, solvent-resistant films. Further, the esters and low polymers are useful as an adhesive, especially in the lamination of plywood, glass and the like.

As a chemical intermediate for the preparation of derivatives and other new chemical compounds the esters are particularly useful. The unique combination of different types of unsaturation and the novel chemical structure possessed by the compounds render the esters particularly versatile for the preparation of derivatives. Condensation of the esters with maleic anhydride or esters of maleic acid (Diels-Alder reaction), chlorination, hydrolysis of chlorination products, and controlled oxidation, etc., yield new and valuable derivatives.

Reference has been made in the specification and the claims to various cyclohexadiene polycarboxylic acids utilized in the preparation of unsaturated alcohol esters. In this terminology, "acids" includes either the corresponding anhydride form or the free acid form of the reagent, since either may be utilized. In the product claims, reference to the acid is merely by way of appellation of the final product, regardless of how made, and is, therefore, not intended to be limiting as to any method employed, since derivatives of the acid having reactive properties similar to the free acid may be utilized.

The melting points of typical cyclohexadiene dicarboxylic acids and their corresponding anhydrides are as follows:

| | Melting Point of— | |
|---|---|---|
| | Acid | Anhydride |
| trans-$\Delta 3,5$-dihydro | 210 | |
| cis-$\Delta 3,5$-dihydro | 173-175 | 99-100 |
| $\Delta 1,4$-dihydro | 153 | 134-135 |
| $\Delta 2,4$-dihydro | 179-180 | 103 |
| $\Delta 2,6$-dihydro | 215 | 81-82 |

The melting points of some of the above acids are not precise due to complications, such as tendency to isomerize.

Suitable procedures for preparing the various cyclohexadiene dicarboxylic acids are disclosed in the literature. The trans-$\Delta 3,5$-cyclohexadiene dicarboxylic acid may be prepared, for example, by sodium mercury amalgam reduction or by electrolytic reduction. The trans-$\Delta 3,5$-cyclohexadiene dicarboxylic acid-1,2 utilized in the specific examples herein disclosed was prepared by electrolytic reduction of phthalic acid in sulfuric acid solution. Such a method is disclosed in Berichte, volume 39 (1906), pages 2933-1942.

Although this invention has been illustrated with various presently preferred processes and products, numerous alterations utilizing the principles thereof will occur to those skilled in the art, and it is to be understood that the invention is not limited to the specific examples and may be otherwise embodied or practiced within the scope of the appended claims.

I claim:

1. A monomeric ester of a conjugated cyclohexadiene dicarboxylic acid 1,2 selected from the group consisting of $\Delta 3,5$ cyclohexadiene dicarboxylic acid 1,2 and $\Delta 2,6$ cyclohexadiene dicarboxylic acid 1,2 and an ethylenically unsaturated monohydric aliphatic alcohol having from 2 to 20 carbon atoms and having only a hydroxyl group as a reactive substituent.

2. A monomeric ester of a conjugated cyclohexadiene dicarboxylic acid 1,2 selected from the group consisting of $\Delta 3,5$ cyclohexadiene dicarboxylic acid 1,2 and $\Delta 2,6$ cyclohexadiene dicarboxylic acid 1,2 and an ethylenically unsaturated monohydric aliphatic alcohol having from 3 to 6 carbon atoms and having only a hydroxyl group as a reactive substituent.

3. A monomeric ester of a conjugated cyclohexadiene dicarboxylic acid 1,2 selected from the group consisting of $\Delta 3,5$ cyclohexadiene dicarboxylic acid 1,2 and $\Delta 2,6$ cyclohexadiene dicarboxylic acid 1,2 and allyl alcohol.

4. A polymeric ester of a conjugated cyclohexadiene dicarboxylic acid 1,2 selected from the group consisting of $\Delta 3,5$ cyclohexadiene dicarboxylic acid 1,2 and $\Delta 2,6$ cyclohexadiene dicarboxylic acid 1,2 and ethylenically unsaturated monohydric aliphatic alcohol having from 2 to 20 carbon atoms and having only a hydroxyl group as a reactive substituent.

5. A polymeric ester of a conjugated cyclohexadiene dicarboxylic acid 1,2 selected from the group consisting of $\Delta 3,5$ cyclohexadiene dicarboxylic acid 1,2 and $\Delta 2,6$ cyclohexadiene dicarboxylic acid 1,2 and allyl alcohol.

WILLIAM E. ELWELL.

REFERENCES CITED

The following references are of record in the file of this patent:

UNITED STATES PATENTS

| Number | Name | Date |
|---|---|---|
| 2,218,439 | Rothrock | Oct. 15, 1940 |
| 2,221,662 | Rothrock | Nov. 12, 1940 |
| 2,221,663 | Rothrock | Nov. 12, 1940 |
| 2,275,034 | Moyle | Mar. 3, 1942 |
| 2,321,942 | Rothrock | June 15, 1943 |
| 2,323,706 | D'Alelio | July 6, 1943 |
| 2,377,095 | Muskat | May 29, 1945 |
| 2,391,226 | Clifford | Dec. 18, 1945 |
| 2,403,791 | D'Alelio | July 9, 1946 |

OTHER REFERENCES

Beilstein, "Hand. der Organ. Chem," vol. IX (4th ed.), page 783.